(12) United States Patent
Gerö et al.

(10) Patent No.: US 9,264,298 B2
(45) Date of Patent: Feb. 16, 2016

(54) TECHNIQUE FOR BUNDLING IN LINK AGGREGATION

(75) Inventors: Balázs Peter Gerö, Budapest (HU);
János Farkas, Kecskemét (HU);
Shahryar Khan, Stockholm (SE);
Panagiotis Saltsidis, Stockholm (SE);
Balázs Varga, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 149 days.

(21) Appl. No.: 13/818,883

(22) PCT Filed: Jun. 28, 2012

(86) PCT No.: PCT/EP2012/002766
§ 371 (c)(1),
(2), (4) Date: Jun. 4, 2013

(87) PCT Pub. No.: WO2013/127414
PCT Pub. Date: Sep. 6, 2013

(65) Prior Publication Data
US 2013/0246635 A1    Sep. 19, 2013

Related U.S. Application Data

(60) Provisional application No. 61/605,837, filed on Mar. 2, 2012, provisional application No. 61/605,818, filed on Mar. 2, 2012.

(51) Int. Cl.
*H04L 12/709*    (2013.01)
*H04L 12/24*    (2006.01)

(52) U.S. Cl.
CPC ........ *H04L 41/0654* (2013.01); *H04L 41/0663* (2013.01); *H04L 45/245* (2013.01); *Y02B 60/33* (2013.01)

(58) Field of Classification Search
CPC .......... H04L 12/24; H04L 12/28; H04L 29/06
See application file for complete search history.

(56) References Cited

U.S. PATENT DOCUMENTS 8,052,830 B2 *  11/2011  Sakata et al. ............... 156/272.8
8,054,830 B2    11/2011  Jain et al.
(Continued)

FOREIGN PATENT DOCUMENTS

WO    2012007164 A1    1/2012

OTHER PUBLICATIONS

Farkas, J., "Resilient Network Interconnect Functionalities", Jun. 16, 2010, pp. 1-13, [Retrieved on Jan. 28, 2013], Retrieved from Internet: http://www.ieee802.org/1/files/public/docs2010/new-farkas-network-interconnect-functionalities-0910-v01.pdf.
(Continued)

*Primary Examiner* — Lashonda Jacobs
(74) *Attorney, Agent, or Firm* — Coats & Bennett, P.L.L.C.

(57) ABSTRACT

Methods and apparatus are disclosed for applying multiple Link Aggregation Group (LAG) entities on the same set of physical links, thus making bundling of individual services or conversations possible by the different LAG entities within Link Aggregation. Each LAG entity is configured such that a single physical link is Active and all the other links are Standby. Each LAG entity may be regarded as a "bundle." Thus the services/conversations are bundled into a LAG entity and are handed-off on the Active link during normal operation. If service hand-off is not possible on the Active link (e.g., due to a failure), then the LAG entity switches over to a Standby link thus the service/conversation is handed-off on that formerly Standby link. Bundling may simplify operations of control and signaling.

18 Claims, 8 Drawing Sheets

(56) References Cited

U.S. PATENT DOCUMENTS

| | | | |
|---|---|---|---|
| 8,160,056 B2 | 4/2012 | Van der Merwe et al. | |
| 8,797,844 B1* | 8/2014 | Strahle et al. | 370/219 |
| 8,839,023 B2 | 9/2014 | Finn et al. | |
| 8,937,865 B1* | 1/2015 | Kumar | H04L 47/125 370/235 |
| 2005/0160171 A1 | 7/2005 | Rabie et al. | |
| 2005/0198371 A1* | 9/2005 | Smith et al. | 709/238 |
| 2007/0237172 A1* | 10/2007 | Zelig et al. | 370/465 |
| 2008/0005752 A1* | 1/2008 | Morris | 719/331 |
| 2008/0181196 A1* | 7/2008 | Regan | H04L 45/00 370/351 |
| 2009/0141622 A1* | 6/2009 | Bitar | 370/225 |
| 2010/0293408 A1 | 11/2010 | Shannon et al. | |
| 2010/0329147 A1* | 12/2010 | Nam et al. | 370/254 |
| 2011/0205909 A1* | 8/2011 | Cao et al. | 370/248 |
| 2012/0182866 A1* | 7/2012 | Vinayagam | H04L 45/245 370/228 |
| 2012/0233492 A1* | 9/2012 | Finn et al. | 714/4.1 |
| 2012/0266013 A1 | 10/2012 | Shannon et al. | |
| 2012/0281541 A1* | 11/2012 | Palmer | H04L 45/245 370/241 |
| 2013/0121141 A1* | 5/2013 | Hao | 370/228 |
| 2013/0170340 A1* | 7/2013 | Boggala et al. | 370/228 |
| 2014/0185627 A1* | 7/2014 | Ditya | H04L 45/44 370/409 |
| 2014/0313932 A1* | 10/2014 | Saltsidis | 370/254 |

OTHER PUBLICATIONS

Interworking Task Group of IEEE 802.1, "Link Aggregation—Amendment: Distributed Resilient Network Interconnect", IEEE P802.1AXbq™/D0.4, Nov. 3, 2011, pp. 1-102, IEEE Standards Department, Piscataway, NJ, USA.

IEEE Computer Society, "IEEE Standard for Local and metropolitan area networks—Link Aggregation", IEEE Std 802.1AX™-2008, Nov. 3, 2008, pp. 1-163, IEEE, NY, USA.

Interworking Task Group of IEEE 802.1, "Draft Standard for Local and Metropolitan Area Networks—Link Aggregation", IEEE P802.1AX-REV™/D0.4, Oct. 5, 2012, pp. 1-188, IEEE Standards Department, Piscataway, NJ, USA.

Rivest, R., "The MD5 Message-Digest Algorithm", Network Working Group, Request for Comments: 1321, Apr. 1, 1992, pp. 1-21, RFC 1321, [Retrieved on Feb. 6, 2013], Retrieved from Internet: http://www.ietf.org/rfc/rfc1321.txt.

Finn, N., "Issues to be discussed on P802.1AXbq D0.3 Distributed Resilient Network Interconnect issues Rev. 1", pp. 1-6; [Retrieved on Feb. 6, 2013], Retrieved from Internet: http://www.ieee802.org/1/files/public/docs2011/bq-nfinn-DRNI-issues-0711-v1.pdf.

Finn, N., "Lightweight Network Network Interface Using Link Aggregation Rev. 2", IEEE 802 interim, Jan. 1, 2008, pp. 1-26, [Retrieved on Feb. 14, 2013], Retrieved from Internet: http://www.ieee802.org/1/files/public/docs2010/new-nfinn-light-nni-0710-v02.pdf, IEEE, California, USA

* cited by examiner

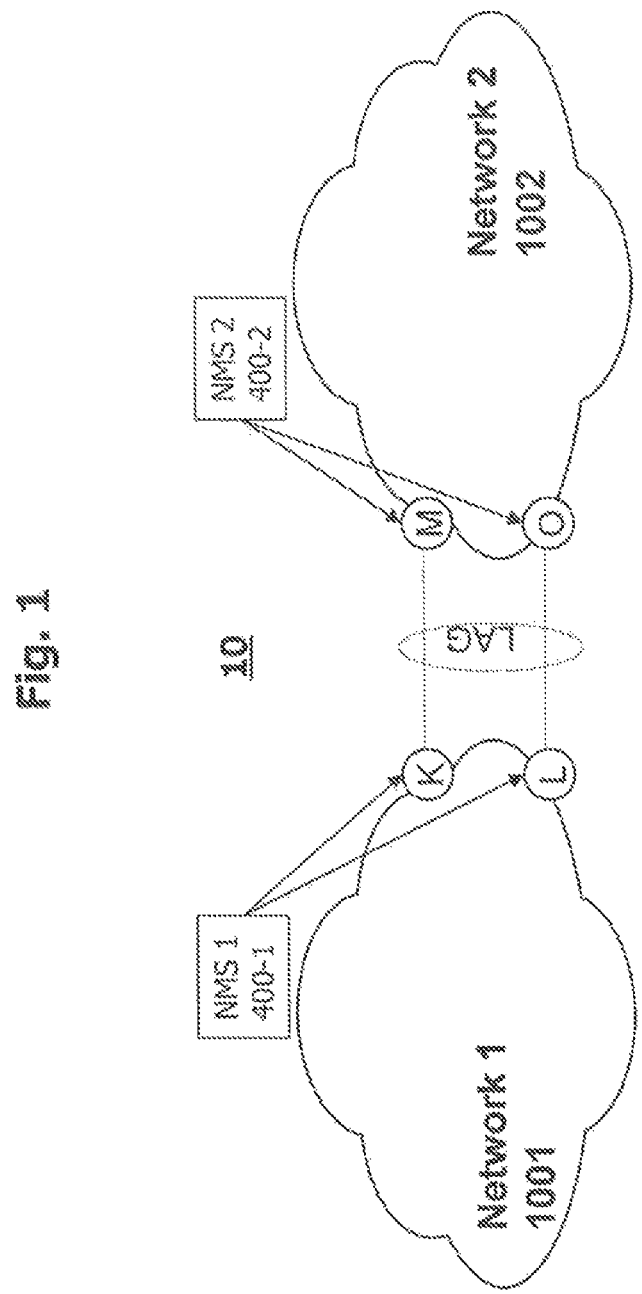

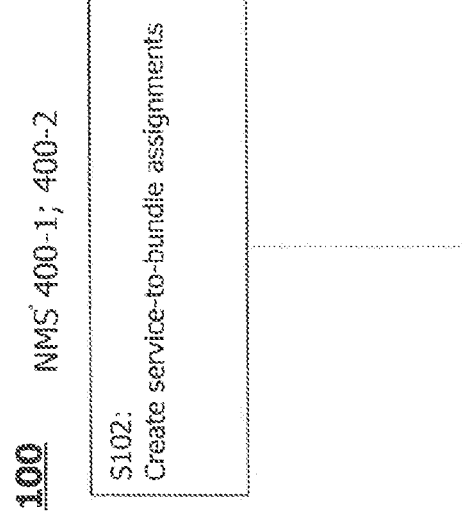

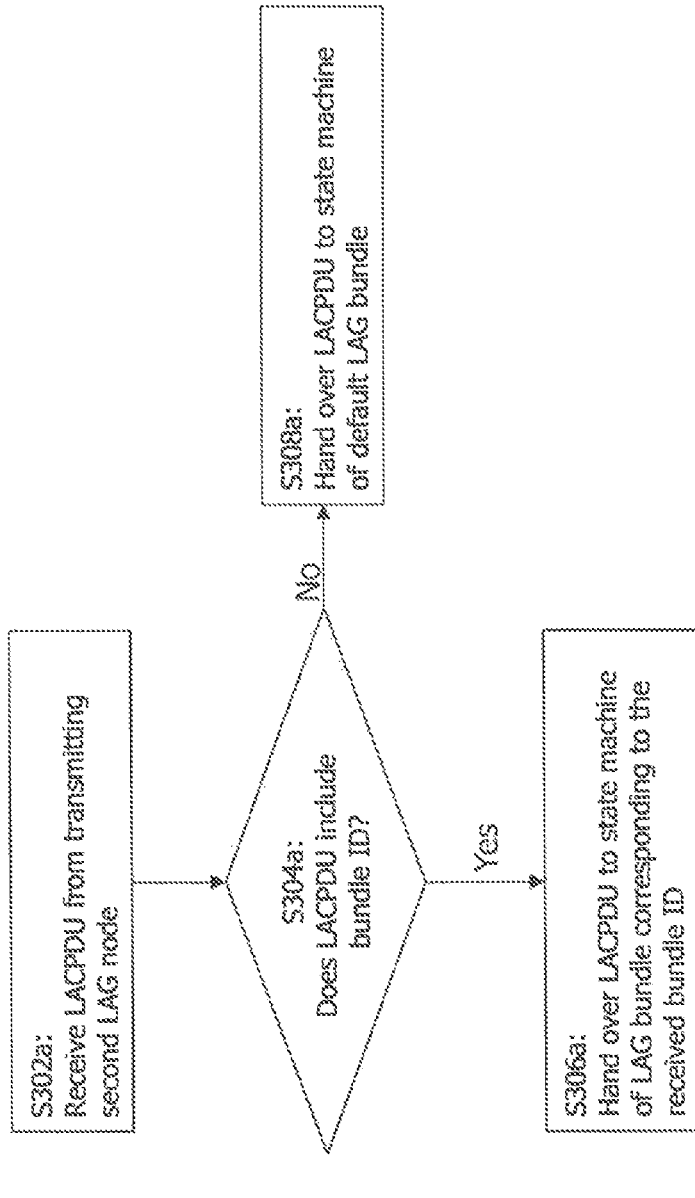

US 9,264,298 B2

TECHNIQUE FOR BUNDLING IN LINK AGGREGATION

TECHNICAL FIELD

The present disclosure generally relates to link aggregation, and particularly relates to a technique for bundling in link aggregation. The technique may be implemented as a method, as a computer program product, as a system or as a network node.

BACKGROUND

Link Aggregation is widely used to aggregate multiple links between a pair of nodes in order to be able to transmit user data on each of the links participating in a Link Aggregation Group (LAG) (see, e.g., IEEE 802.1AX 2008). Aggregating multiple network connections in this fashion can increase throughput beyond what a single connection can sustain, and/or can be used to provide redundancy in case of a failure of one of the links. The "Distributed Resilient Network Interconnect" (DRNI) project (see IEEE 802.1AXbq/ D0.4) specifies extensions to Link Aggregation in order to be able to use link aggregation on a network interface even between more than two nodes.

Among its aims, the 802.1AXbq project aims to provide means for enforcing that the frames (e.g. IP packets) of a given conversation are transmitted by a particular physical link. Furthermore, congruency is aimed to be provided— meaning that the same physical link is used for a particular conversation both in the forward and the backward direction. In addition, load balancing is also aimed to be supported, such that multiple links of a LAG are used for frame transmission, and a single link is used exclusively as an "Active" link for all traffic while a "Standby" link goes unused.

In case of a network interface a conversation can be referred to as a service, as typically a service is handed-off through the interface. The service handed-off on an interface may be a Virtual Local Area Network (VLAN) thus the service identifier may be a VLAN Identifier (VID), such as Service VID (i.e. "S-VID") (typically identifying services on Network to Network Interfaces (NNIS)) or a Customer VID (i.e. "C-VID") (typically identifying services on User to Network Interfaces (UNIs)).

SUMMARY

There is a need for a technique for facilitating link aggregation processing for a plurality of network services.

In a first aspect, there is provided a method for configuring a plurality of first Link Aggregation Group, LAG, nodes of a first LAG virtual node of a first network being associated with the first LAG virtual node, the method being implemented by a Network Management System, NMS, and comprising the step of creating service-to-bundle assignments that assign each of a plurality of network services that utilize the first LAG nodes to a respective LAG bundle, wherein each LAG bundle designates one or more first links between the first LAG virtual node and a second LAG virtual node of a remote second network as active links, and designates one or more other links between the first and second LAG virtual nodes as standby links to be used in case of active link failure.

The method may further comprise the optional step of transmitting the service-to-bundle assignments to one or multiple LAG (virtual) nodes, such as to one or more first LAG (virtual) nodes. The transmitted service-to-bundle assignments may be used by the receiving LAG nodes for various purposes including for use in processing frames communicated via the links. The processed frames may be service frames.

The step of creating the service-to-bundle assignments may further include creating a bundle identifier for the respective LAG bundle.

In a second aspect, there is provided a method for Link Aggregation Group, LAG, processing, wherein a first LAG node is included in a plurality of LAG bundles, each LAG bundle designating one or more first links between a first LAG virtual node and a second LAG virtual node of a remote second network as active links, and designating one or more other links between the first and second LAG virtual nodes as standby links to be used in case of active link failure, the method being implemented by the first LAG node of a first network and comprising the step of determining a bundle identifier of a LAG bundle for which a given service frame is intended.

The method according to the second aspect may further comprise transmitting the frame (e.g. a control frame) and determined bundle identifier to the remote LAG network node. The frame and the bundle identifier may be transmitted individually or together. In the latter case the bundle identifier may be included into the frame prior to the transmitting step.

In a third aspect, there is provided a method for frame processing, wherein a first Link Aggregation Group, LAG, node of a first LAG virtual node in a first network is included in a plurality of LAG bundles, each LAG bundle designating one or more first links between the first LAG virtual node and a second LAG virtual node of a remote second network as active links, the second virtual node comprising one or more second LAG nodes, and designating one or more other links between the first and second LAG virtual nodes as standby links to be used in case of active link failure, the method being implemented in the first LAG node and comprising the steps of receiving a frame from the second LAG node of the remote network; determining whether the frame includes a LAG bundle identifier; and invoking, responsive to the frame including a recognized bundle identifier, an LAG bundle corresponding to the bundle identifier to process the received frame.

In a refinement of the third aspect, the method may further comprise invoking, responsive to the frame not including a recognized bundle identifier, a default LAG bundle to process the received frame.

In another refinement of the third aspect, the frame may be a control frame such as a Link Aggregation Control Protocol Data Unit, LACPDU, wherein if the determining step is affirmative, the LACPDU may be handed over to a state machine of a default LAG bundle, and if the determining step is not affirmative, the LACPDU may be handed over to the state machine of the LAG bundle corresponding to the bundle identifier. If so, if LACPDUs without bundle identifiers are received, an unnumbered LAG bundle may be formed, which unnumbered LAG bundle is used as the default bundle. As a first alternative, distinct LACPDUs may be carried for each LAG bundle. As a second alternative, information belonging to different LAG bundles may be carried in a single LACPDU.

In a still further refinement of the third aspect, a single physical link may take part in multiple LAG bundles. If so, the single physical link may be a standby link for one LAG bundle and is an active link for another LAG bundle. In the latter case, N nodes of the first network and N nodes of the second network may have N links and may configure N LAG bundles such that every one of the N links is the passive link in one bundle and an active link in all other bundles, N being an integer greater than 2.

In a fourth refinement of the third aspect, plural services may be uniquely assigned to one LAG bundle. If so, sets of services assigned to different LAG bundles may be disjoint sets. Each LAG bundle may comprise a subgroup of links.

In a fourth aspect, there is provided a computer program product comprising program code portions for performing the method of any one of the preceding claims when the computer program product is executed on one or more computing devices. The computer program product may be stored on a computer readable recording medium.

In a fifth aspect, there is provided a Network Management System, NMS, for configuring a plurality of first Link Aggregation Group, LAG, nodes of a first LAG virtual node of a first network being associated with the first LAG virtual node, the system comprising a processor, operably connected to a memory and an input/output device, configured to create service-to-bundle assignments that assign each of a plurality of network services that utilize the first LAG nodes to a respective LAG bundle, wherein each LAG bundle designates one or more first links between a first LAG virtual node and a second LAG virtual node of a remote second network as active links, and designates one or more other links between the first and second LAG virtual nodes as standby links to be used in case of active link failure.

The NMS may further be configured to transmit the service-to-bundle assignments to one or more LAG (virtual) nodes, such as the first LAG (virtual) nodes. The transmitted service-to-bundle assignments may be used there for processing service frames communicated via the links.

In a sixth aspect, there is provided a Link Aggregation Group, LAG, node of a first network, wherein the first LAG node is included in a plurality of LAG bundles, each LAG bundle designating one or more first links between a first LAG virtual node and a second LAG virtual node of a remote second network as active links, and designating one or more other links between the first and second LAG virtual nodes as standby links to be used in case of active link failure, the LAG node comprising a processor, operably connected to a memory and an input/output device, configured to determine a bundle identifier of a LAG bundle for which a given frame is intended.

The LAG node may be configured to transmit the frame and the determined bundle identifier to the remote LAG node.

In a seventh aspect, there is provided a Link Aggregation Group, LAG, node of a first LAG virtual node in a first network, the LAG node being included in a plurality of LAG bundles, each LAG bundle designating one or more first links between the first LAG virtual node and a second LAG virtual node of a remote second network as active links, the second virtual node comprising one or more second LAG nodes, and designating one or more other links between the first and second LAG virtual nodes as standby links to be used in case of active link failure, the LAG node comprising a processor, operably connected to a memory and an input/output device, configured to receive a frame from the second LAG node of the remote network, determine whether the frame includes an LAG bundle identifier; invoke, responsive to the frame including a recognized bundle identifier, an LAG bundle corresponding to the bundle identifier to process the received control frame; and invoke, responsive to the frame not including a recognized bundle identifier, the first LAG node a default LAG bundle to process the received frame.

Of course, the present disclosure is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIGS. 1-2 illustrate an example LAG network topology;

FIG. 8 illustrates a method of configuring LAG virtual nodes that is implemented by a Network Management System (NMS);

FIG. 10A illustrates an alternative method of receiving frames that is implemented by a receiving LAG node;

DETAILED DESCRIPTION

Figure 4:
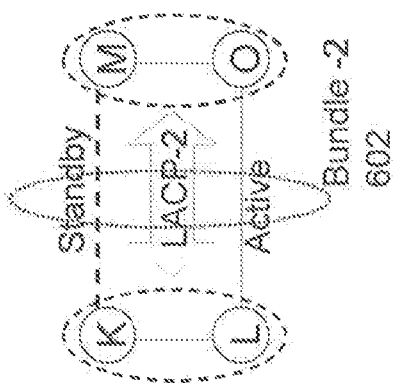
FIG. 4 illustrates a second bundle for use in the network topology of FIG. 2.

In the following description, for purposes of explanation and not limitation, specific details are set forth, such as specific device configurations and specific signalling scenarios, in order to provide a thorough understanding of the present disclosure. It will be apparent to one skilled in the art that the technique presented herein may be practiced in other embodiments that depart from these specific details. The skilled artisan will appreciate, for example, that the technique discussed herein may be practiced in combination with standards different from the IEEE standards discussed hereinafter.

Those skilled in the art will further appreciate that the methods, steps and functions explained herein below may be implemented using individual hardware circuitry, using software functioning in conjunction with a programmed microprocessor or a general purpose computer, using one or more Application Specific Integrated Circuits (ASICs), one or more Digital Signal Processors (DSPs), and/or one or more Field Programmable Gate Arrays (FPGAs). It will also be appreciated that the methods, steps and functions disclosed herein may be embodied in a processor and a memory coupled to the processor, wherein the memory stores one or more programs that perform the steps discussed herein when executed by the processor.

The present disclosure provides a technique for bundling in link aggregation, which was not available before. That is, several services such as conversations can be grouped into multiple bundles and treated together by LAG, e.g. in case of a switchover from one link to another. This grouping, or bundling, may reduce the signaling and control operation burden both within DRNI and even to the farther network nodes not participating in the DRNI but having a forwarding path to the DRNI. Thus, fault management and signaling can be implemented per bundle as will now be described in greater detail.

According to the present disclosure, multiple LAG entities may be applied on the same set of physical links, thus making bundling of individual services or conversations possible by the different LAG entities within Link Aggregation. Each LAG entity may configured such that a single physical link is "Active" and all the other links are "Standby." Each LAG entity may be regarded as a bundle. Thus the services/conversations are bundled into a LAG entity and are handed-off on the Active link during normal operation. If service hand-off is not possible on the Active link, e.g. due to a failure, then the LAG entity may switch over to a Standby link. Thus the service/conversation is handed-off on that formerly Standby link.

Each bundle, i.e. LAG entity, has its own distinct Bundle ID, which is carried in each LACPDU belonging to that particular LAG entity. Thus, load balancing is possible by means of configuring different physical links as Active links for the different bundles, i.e. LAG entities. Furthermore, congruent service hand-off is ensured within each bundle, i.e. within each LAG entity, as there is only a single Active link for the LAG entity. Thus the service is handed-off on the same physical link in both directions.

The LAG entity formed by IEEE 802.1AX-2008 LAG is an unnumbered entity without Bundle ID and it may be designated as the Default Bundle. The Default Bundle can be used in case of misconfigurations for services requiring congruent service hand-off. That is, if misconfiguration is detected between the two sides of the Link Aggregation, then the Default Bundle is used for service hand-off in order to enforce congruency.

According to one exemplary example, a method is implemented by a Network Management System (NMS) for configuring a plurality of first LAG nodes of a first LAG virtual node of its associated network. According to the method, the NMS creates service-to-bundle assignments that assign each of a plurality of network services that utilize the first LAG nodes to a respective Link Aggregation Group (LAG) bundle. Each LAG bundle designates one or more first links between the first LAG nodes and second LAG nodes of a remote second network as active links, and designates one or more other links between the first and second LAG nodes as standby links to be used in case of active link failure. In an optional further step NMS then transmits the service-to-bundle assignments to the first LAG nodes for use in processing service frames communicated via the links. In one or more embodiments, creating the service-to-bundle assignments may include creating a bundle ID for the bundles in question.

According to another exemplary example, a method is implemented by a first LAG network node of a first network, the first LAG node being included in a plurality of Link Aggregation Group (LAG) bundles. Each LAG bundle designates one or more first links between the first LAG node and a second LAG node of a remote second network as active links, and designates one or more other links between the first and LAG second nodes as standby links to be used in case of active link failure. According to the method, the first network node determines a bundle identifier of a LAG bundle for which a given frame is intended, and, in an optional further step, transmits the frame and the determined bundle identifier to the remote LAG network node.

According to a still further exemplary example, a method is implemented by a first LAG node of a first LAG virtual node in a first network, with the first LAG node being included in a plurality of Link Aggregation Group (LAG) bundles. Each LAG bundle designates one or more first links between the first LAG virtual node and a second LAG virtual node of a remote second network as active links, and designates one or more other links between the first and second LAG virtual nodes as standby links to be used in case of active link failure. According to this method, the first LAG node receives a frame from the second LAG node of the remote network, and determines whether the frame includes a Link Aggregation Group (LAG) bundle identifier. Responsive to the frame including a recognized bundle ID, the first LAG node invokes a LAG entity corresponding to the bundle ID to process the received frame. Otherwise, the first LAG node invokes a default LAG entity to process the received frame.

The proposed bundling technique provides backwards compatibility to the standard IEEE 802.1AX-2008 LAG and reuses the existing protocol and state machines, by providing extensions to it. Applying the bundling methods described here removes the need for other mechanisms for enforcing the use of a particular link for a given service or conversation, e.g. no need for VID based blocking.

Figure 2:
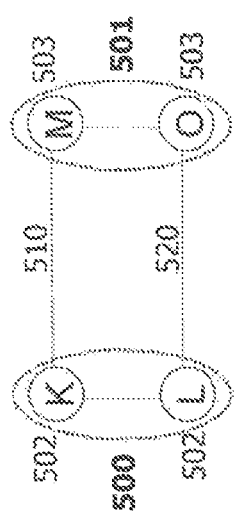

The same physical links are assigned to multiple LAG entities (i.e. multiple "bundles") at the same time. FIGS. 1 and 2 illustrate an example physical topology upon which multiple LAG entities are applied. LAG nodes K and L form a single LAG virtual node "KL" for Link Aggregation (i.e., are seen as a single node "KL" for the LAG nodes M and O on other side of the LAG). Similarly, LAG nodes M and O form a single LAG virtual node "MO" towards LAG nodes K and L. Note that links K-M and L-O may be network internal or network interface links.

Figure 3:
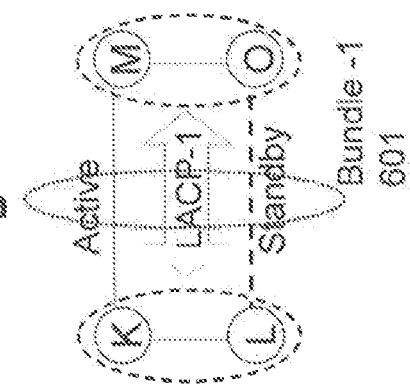
FIG. 3 illustrates a first bundle for use in the network topology of FIG. 2.

FIGS. 3 and 4 illustrate how multiple LAG entities may be used on top of the physical topology illustrated in FIG. 2. Each LAG entity has its own distinct bundle identifier. The first LAG entity ("Bundle-1") is illustrated in FIG. 3. Bundle-1 is configured such that K-M link is the "Active" link, the other L-O link is a "Standby" link. Thus, it is the K-M link that carries all the traffic in both directions during normal operation for the services (e.g. VIDs) assigned to Bundle-1. In the event of a failure on the K-M link, the standby L-O link would carry traffic in place of the previously active K-M link. The indicators "LACP-1" in FIG. 3 and "LACP-2" in FIG. 4 indicate that the bundles may correspond to Link Aggregation Control Protocol (LACP) entities for processing LACP Data Units (LACPDUs).

The second LAG entity is Bundle-2 as illustrated in FIG. 4. Bundle-2 is configured such that the L-O link is the Active link and the K-M link is the standby link. Note that there is no need for another bundle for the topology shown in FIG. 2, as the two bundles cover the two links participating in the aggregation.

Figure 7:
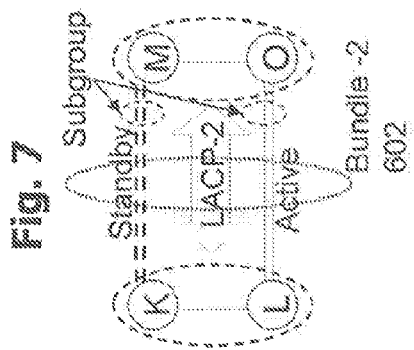
FIG. 7 illustrates a second bundle for use in the network topology of FIG. 5.
Figure 5:
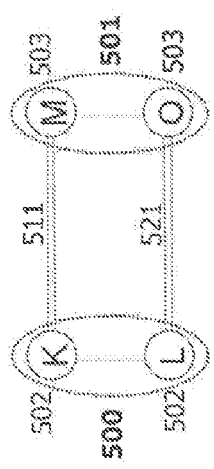
FIG. 5 illustrates a second LAG network topology.
Figure 6:
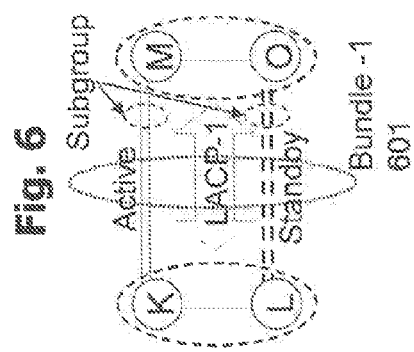
FIG. 6 illustrates a first bundle for use in the network topology of FIG. 5.

Note that in one or more embodiments, each LAG entity may have subgroups as specified in IEEE 802.1AX-2008. For example, in case of a physical topology shown in FIG. 5, the subgroups of Bundle-1 may be as shown in FIG. 6, and the subgroups of Bundle-2 may be as depicted in FIG. 7.

Due to the different configuration of the different LAG entities, i.e. their use of different links, load balancing can be implemented by means of assigning different services to the different LAG entities, i.e. bundles. For example one part of the services can be assigned to Bundle-1 and the other part of the services to Bundle-2 such that both K-M and L-O links carry half of the traffic (to implement load balancing). Note that it may happen due to a misconfiguration that a particular service is not assigned to the same bundle at the two sides of the LAG—resulting in incongruency.

Note that a single physical link takes part of multiple LAG entities. For example, the K-M link is an "Active" link in the LAG entity of FIG. 3, and is a "Standby" link in the LAG entity of FIG. 4. Furthermore, the assignment of services to LAG entities is many to one in a disjoint manner. That is, a single LAG entity may be assigned many services, but each service can only be assigned to a single LAG entity. Thus, the sets of services assigned to different LAG entities are disjoint sets.

The two sides of the Link Aggregation may run LACP, and may therefore exchange LACPDUs. In that case, the information carried in the PDUs for the different LAG entities has to be split from each other and it has to be clear what information belongs to which LAG entity, i.e. to which bundle. To accommodate this, a bundle identifier may be included in transmitted LACPDUs. Basically, there can be two implementations of information exchange by LACP. For example, each LAG entity may have its own LACP, i.e. distinct LACP-DUs are carried for each LAG entity, e.g. as illustrated in FIGS. 3-4 and 6-7. Alternatively, the information belonging to different LAG entities may be carried in a single LACPDU, e.g. such that the information is organized into blocks and each block has the Bundle ID as its first field.

FIG. 8 illustrates a method 100 of configuring network nodes that is implemented by a Network Management System (NMS). As an example, NMS1 of FIG. 1 will be described as performing this method. Thus, NMS1 creates service-to-bundle assignments that assign each of a plurality of network services that utilize the first LAG nodes K and L to a respective Link Aggregation Group (LAG) bundle (e.g. "Bundle-1" of FIG. 3, and "Bundle-2" of FIG. 4) (step 102). Each LAG bundle designates one or more first links between the first LAG nodes and second LAG nodes of a remote second network (e.g. Network 2) as active links, and designates one or more other links between the first and second nodes as standby links to be used in case of active link failure. NMS1 then transmits the service-to-bundle assignment to the first LAG nodes K and L for use in processing service frames communicated via the links. In one or more embodiments, creating the service-to-bundle assignments may include creating a bundle ID for the bundles in question.

Although the method 100 has been described as being implemented by the NMS1, it is understood that NMS2 could similarly perform the method 100. NMS1 and NMS2 may also be in communication with each other to ensure congruency in the service-to-bundle assignments. By assigning specific services to specific LAG bundles (and therefore specific active links), the NMS is able to implement load balancing between its associated nodes (e.g. NMS1 implementing load balancing for LAG nodes K and L).

Figure 9:
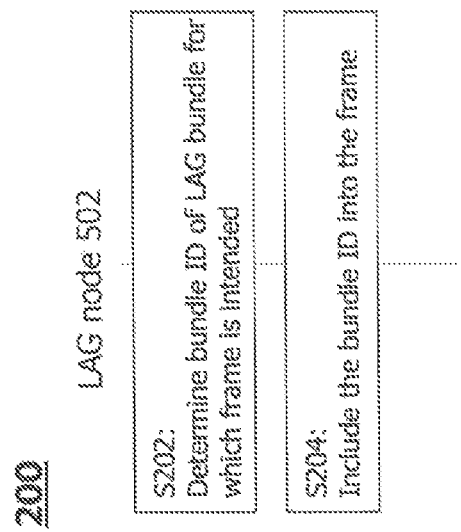
FIG. 9 illustrates a method of transmitting frames that is implemented by a transmitting LAG node.

FIG. 9 illustrates a method 200 of transmitting frames between LAG nodes that is implemented by a transmitting network node. As an example, the LAG virtual node KL (which includes separate LAG nodes K and L) will be described as implementing the method 200. The KL node determines a bundle identifier of a LAG bundle for which a given frame is intended (step 202), and transmits the frame and the determined bundle identifier to the remote second network LAG node.

Figure 10:
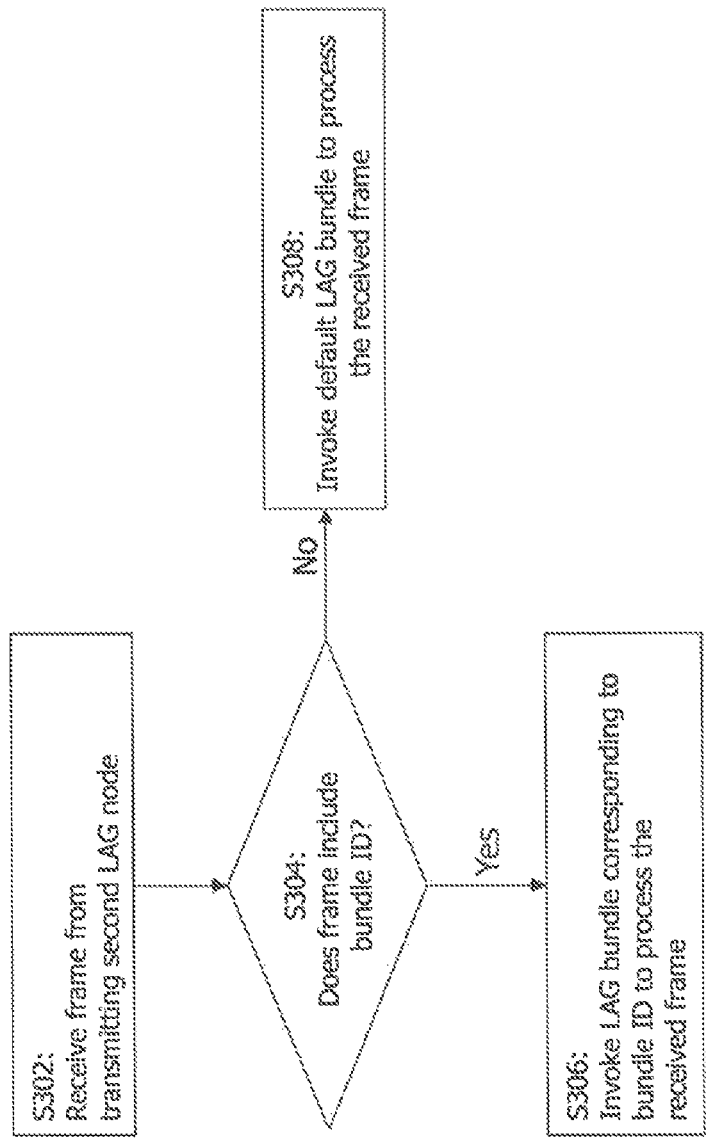
FIG. 10 illustrates a method of receiving frames that is implemented by a receiving LAG node.

FIG. 10 illustrates a method of receiving frames that is implemented by a receiving LAG node. As an example, the LAG node K will be described as implementing the method 300. The LAG node K receives a frame from remote LAG node M (step 302), and determines whether the frame includes a Link Aggregation Group (LAG) bundle identifier (step 304). Responsive to the frame including a recognized bundle ID, the node K invokes a LAG entity corresponding to the bundle ID to process the received frame (step 306). Otherwise, the first node invokes a default LAG entity to process the received frame (step 308).

FIG. 10A illustrates an alternative method of receiving frames that is implemented by a receiving LAG node. The frames discussed above may correspond to LACPDUs. Thus, to elaborate on the method 300, if the frame is an LACPDU which does not carry any Bundle ID (step 304a), then it is handed to the state machines of the Default LAG entity (step 308a). However, if the LACPDU contains a Bundle ID then, the LACPDU is handed to the state machines of the LAG entity corresponding to the Bundle ID (step 306a).

The bundling technique described in this disclosure provides backwards compatibility with IEEE 802.1AX-2008, which does not have any support for bundling. The LACP-DUs specified in IEEE 802.1AX do not carry any Bundle ID. If LACPDUs without Bundle ID are received then the Link Aggregation Group is formed and the operation of LAG is as specified in IEEE 802.1AX. This unnumbered LAG can be used as the Default Bundle, which always provides the connectivity even if the features specified in this disclosure are misconfigured or malfunctioning. Services or conversations not assigned to any specific Bundle ID are assigned by default to the Default Bundle thus the connectivity is provided by the Default LAG. If there is a misconfiguration related to the assignment of a service to the Bundle ID, then that particular service can be moved to the Default Bundle in order to provide congruent connectivity until the configuration error is fixed. If congruent connectivity needs to be provided by the Default LAG, then the Default LAG has to be configured in the Active/Standby operation mode, i.e. there can be only a single Active link.

Congruency is provided by means of the Active/Standby operation of a LAG entity, and there is no need for any other mechanism to provide congruency. Non-congruent service hand-off can be implemented by configuring a LAG entity in an Active/Active operation mode, i.e. there is more than one Active link within that LAG entity.

Figure 11:
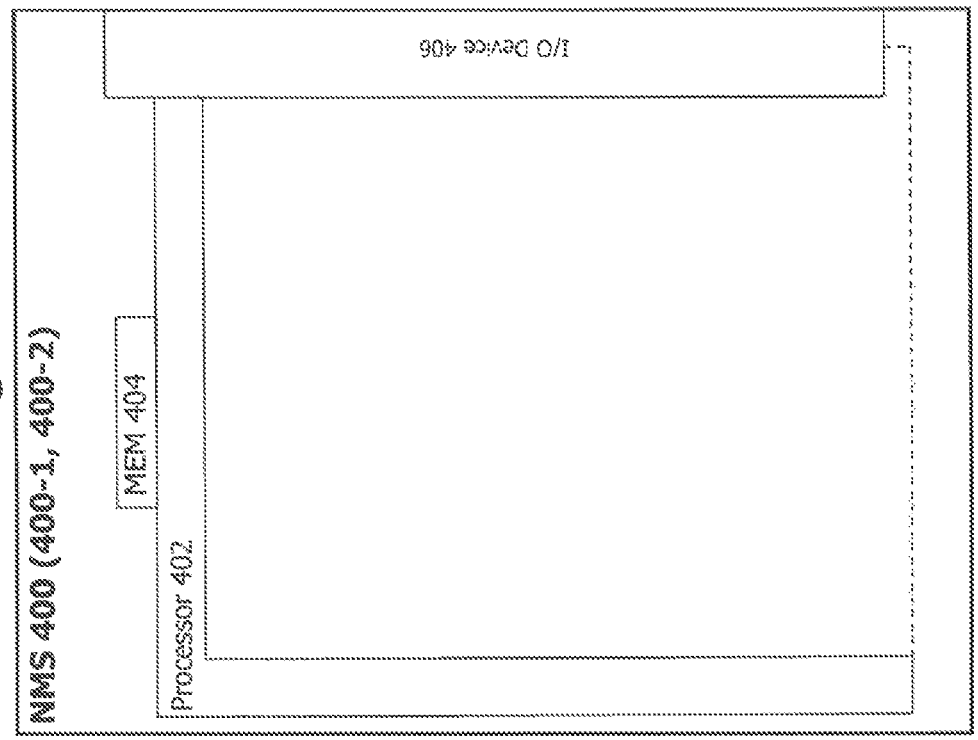
FIG. 11 illustrates an example NMS.

Referring to FIG. 11, an example NMS 400 is illustrated. The NMS 400 includes a processor 402 operable to implement the method 100. The processor 402 is operatively connected to memory 404 and at least one input/output device 406 for communicating with its associated nodes (e.g. NMS1 communicating with nodes K and L). The memory 404 may be used to store the service-to-bundle assignments discussed above, for example. The functions processor 402 may be implemented by one or more microprocessors, hardware, firmware, or a combination thereof.

Figure 12:
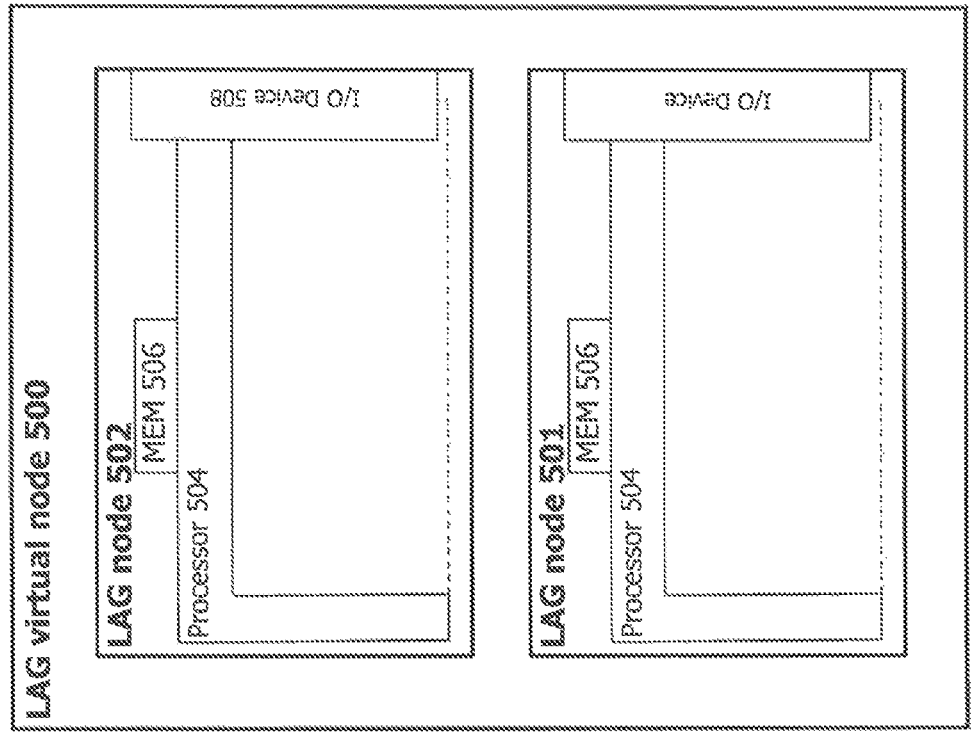
FIG. 12 illustrates an example LAG virtual node.

Referring to FIG. 12, an example LAG virtual node 500 is disclosed (e.g. node KL) which includes associated LAG nodes 502, 504 (e.g. node K and node L). Each LAG node 502 includes a processor 504 operative to implement the methods 200, 300 discussed above. In one example, whichever of the nodes 502 that is on a terminal end of an "Active" link is the node 502 that performs the method 200, 300. The node 502 also includes memory 506 and one or more input/output devices for communicating with other nodes. The processor 504 may be implemented by one or more microprocessors, hardware, firmware, or a combination thereof. As described above, each node 502 may implement a plurality of LAG entities (i.e. LAG bundles) at any given time. In one example, the methods 200, 300 are separately performed by each node 502 of a corresponding LAG virtual node 500.

In the technique presented herein, service and control frames may be distinguished. In one implementation the bundle identifier is only carried in control frames, such as LACPDUs, but not in service frames. The unambiguous assignment of a service to a bundle makes it possible to derive the bundle identifier from the service identifier (and vice versa) because the service identifier (e.g., a VLAN ID) is always carried in the service frames. In many implementations it may thus be unnecessary to (additionally) carry the bundle identifier explicitly in the service frames. Carrying the bundle identifier in the control frames permits to distinguish the control entity the frame belongs to.

The foregoing description and the accompanying drawings represent non-limiting examples of the methods and apparatus taught herein. As such, the present disclosure is not limited by the foregoing description and accompanying drawings.

The invention claimed is:

1. A method for configuring a plurality of first Link Aggregation Group (LAG) nodes of a first LAG virtual node of a first network, the method implemented by a Network Management System (NMS) computing device and comprising:
    creating service-to-bundle assignments that assign each of a plurality of network services that utilize the first LAG nodes to a respective LAG bundle, wherein each LAG bundle designates one or more first links between the first LAG virtual node and a second LAG virtual node of a remote second network as active links, and designates one or more other links between the first and second LAG virtual nodes as standby links to be used in case of active link failure; and
    transmitting the service-to-bundle assignments to the first LAG nodes, wherein the first LAG nodes are included in a plurality of LAG bundles.

2. The method of claim 1, wherein the creating service-to-bundle assignments comprises creating a bundle identifier for the respective LAG bundle.

3. The method of claim 1, wherein a single physical link is used for multiple LAG bundles.

4. The method of claim 3, wherein the single physical link is a standby link for one LAG bundle and is an active link for another LAG bundle.

5. The method of claim 4, wherein N LAG nodes of the first network and N LAG nodes of the second network are connected by N links and configure N LAG bundles, such that every one of the N links is the passive link in one bundle and an active link in all other bundles, wherein N is an integer greater than 2.

6. The method of claim 1, wherein a plurality of services are uniquely assigned to one LAG bundle.

7. The method of claim 6, wherein sets of services assigned to different LAG bundles are disjoint sets.

8. The method of claim 1, wherein each LAG bundle comprises a subgroup of links.

9. A method for Link Aggregation Group (LAG) processing, the method implemented by processing circuitry of a first LAG node of a first network and comprising:
    determining a bundle identifier of a LAG bundle for which a given frame is intended, the LAG bundle including the first LAG node, wherein the first LAG node is part of a first LAG virtual node of the first network, wherein the first LAG node is included in a plurality of LAG bundles, each LAG bundle designating one or more first links between the first LAG virtual node of the first network and a second LAG virtual node of a remote second network as active links, and designating one or more other links between the first and second LAG virtual nodes as standby links to be used in case of active link failure; and
    performing signaling between the first LAG node and the second LAG virtual node based on the determining.

10. A method for Link Aggregation Group (LAG) frame processing in a first LAG node of a first network, the method implemented by processing circuitry of the first LAG node of the first network and comprising:
    receiving a control frame from a second LAG node of the remote second network;
    determining whether the frame includes a LAG bundle identifier for a LAG bundle that designates one or more active links and one or more standby links, the first LAG node being part of a first LAG virtual node in the first network and included in a plurality of LAG bundles, wherein each LAG bundle designates one or more first links between the first LAG virtual node and a second LAG virtual node of a remote second network as active links, the second LAG virtual node comprising one or more second LAG nodes, and designates one or more other links between the first and second LAG virtual nodes as standby links to be used in case of active link failure; and
    if the control frame includes a recognized bundle identifier, using a LAG bundle corresponding to the bundle identifier to process the received control frame; and
    if the control frame does not include a recognized bundle identifier, using a default LAG bundle to process the received control frame;
    wherein the control frame is a Link Aggregation Control Protocol Data Unit (LACPDU).

11. The method of claim 10, further comprising:
    handing over the LACPDU to a state machine of a default LAG bundle responsive to the frame not including a recognized LAG bundle identifier; and
    handing over the LACPDU to a state machine of the LAG bundle corresponding to the bundle identifier responsive to the frame including a recognized bundle identifier.

12. The method of claim 11, wherein if LACPDUs without bundle identifiers are received, an unnumbered LAG bundle is formed and is used as the default LAG bundle.

13. The method of claim 11, wherein distinct LACPDUs are carried for each LAG bundle.

14. The method according to claim 11, wherein information belonging to different LAG bundles is carried in a single LACPDU.

15. A computer program product stored in a non-transitory computer readable medium and comprising program instructions for configuring a plurality of first Link Aggregation Group (LAG) nodes of a first LAG virtual node of a first network, the computer program product comprising computer program code which, when run on a processor of a Network Management System (NMS) configures the NMS to:
    create service-to-bundle assignments that assign each of a plurality of network services that utilize the first LAG nodes to a respective LAG bundle, wherein the first LAG nodes are included in a plurality of LAG bundles;
    wherein each LAG bundle designates one or more first links between the first LAG virtual node and a second LAG virtual node of a remote second network as active links, and designates one or more other links between the first and second LAG virtual nodes as standby links to be used in case of active link failure.

16. A Network Management System (NMS) for configuring a plurality of first Link Aggregation Group (LAG) nodes of a first LAG virtual node of a first network, the NMS comprising:
    a processor operably connected to a memory and an input/output device, the processor configured to:
        create service-to-bundle assignments that assign each of a plurality of network services that utilize the first LAG nodes to a respective LAG bundle, wherein the first LAG nodes are included in a plurality of LAG bundles;
        wherein each LAG bundle designates one or more first links between the first LAG virtual node and a second LAG virtual node of a remote second network as active links, and designates one or more other links between the first and second LAG virtual nodes as standby links to be used in case of active link failure.

17. A first Link Aggregation Group (LAG) node of a first network, the first LAG node comprising:
a processor operably connected to a memory and an input/output device, the processor configured to determine a bundle identifier of a LAG bundle for which a given frame is intended;
wherein the first LAG node is included in a plurality of LAG bundles, each LAG bundle designating one or more first links between a first LAG virtual node of the first network and a second LAG virtual node of a remote second network as active links, and designating one or more other links between the first and second LAG virtual nodes as standby links to be used in case of active link failure.

18. A first Link Aggregation Group (LAG) node of a first LAG virtual node in a first network, the first LAG node comprising:
a processor operably connected to a memory and an input/output device;
wherein the first LAG node is configured to:
receive a frame from a second LAG node of a remote second network;
determine whether the frame includes an LAG bundle identifier for a LAG bundle that designates one or more active links and one or more standby links;
if the control frame includes a recognized bundle identifier, use a LAG bundle corresponding to the bundle identifier to process the received frame; and
if the control frame does not include a recognized bundle identifier, use a default LAG bundle to process the received frame;
wherein the first LAG node is included in a plurality of LAG bundles, each LAG bundle designating one or more first links between the first LAG virtual node and the second LAG virtual node of the remote second network as active links, the second virtual node comprising one or more second LAG nodes, and designating one or more other links between the first and second LAG virtual nodes as standby links to be used in case of active link failure; and
wherein the control frame is a Link Aggregation Control Protocol Data Unit (LACPDU).

* * * * *

UNITED STATES PATENT AND TRADEMARK OFFICE
CERTIFICATE OF CORRECTION

| | | |
|---|---|---|
| PATENT NO. | : 9,264,298 B2 | Page 1 of 1 |
| APPLICATION NO. | : 13/818883 | |
| DATED | : February 16, 2016 | |
| INVENTOR(S) | : Gerö et al. | |

It is certified that error appears in the above-identified patent and that said Letters Patent is hereby corrected as shown below:

On the Title Page 2, item (56), under "OTHER PUBLICATIONS", Column 2, Line 20, delete "Network Network" and insert -- Network --, therefor.

In the Specification

Column 1, Line 42, delete "(NNIS))" and insert -- (NNIs)) --, therefor.

Column 4, Line 9, delete "FIG.2." and insert -- FIG.2; --, therefor.

Signed and Sealed this
Twenty-sixth Day of April, 2016

Michelle K. Lee
*Director of the United States Patent and Trademark Office*